United States Patent Office 3,606,589
Patented Sept. 20, 1971

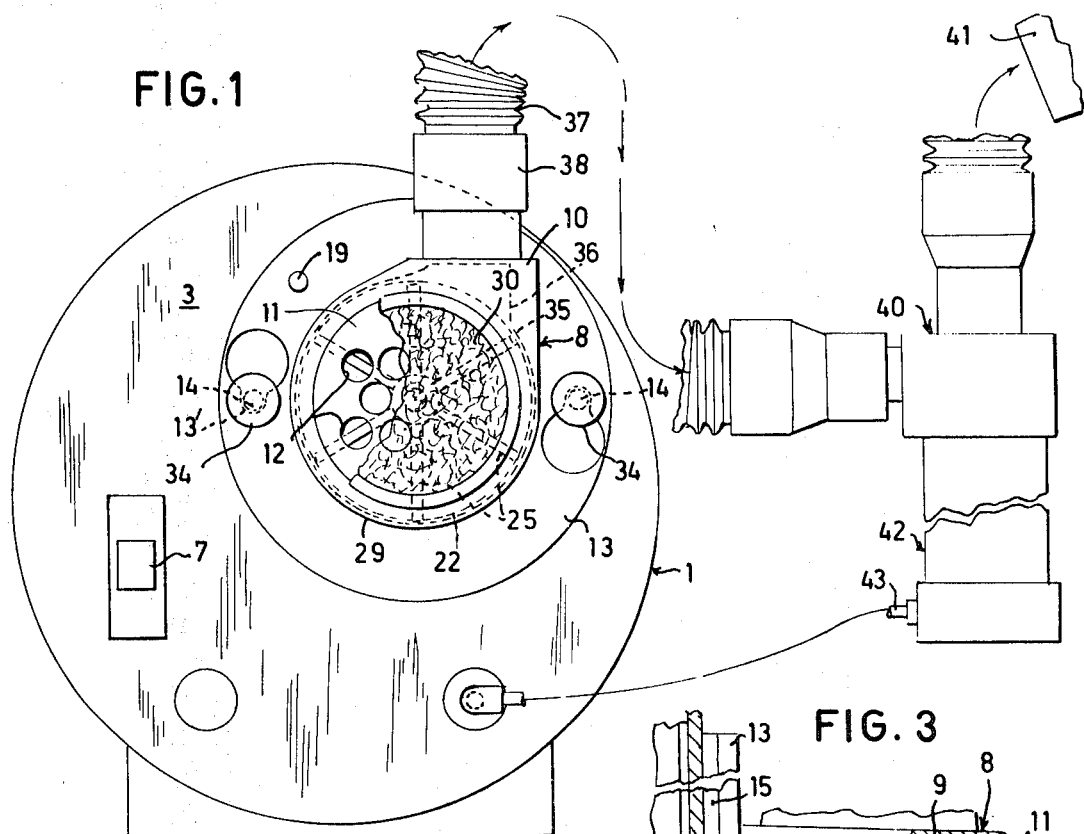
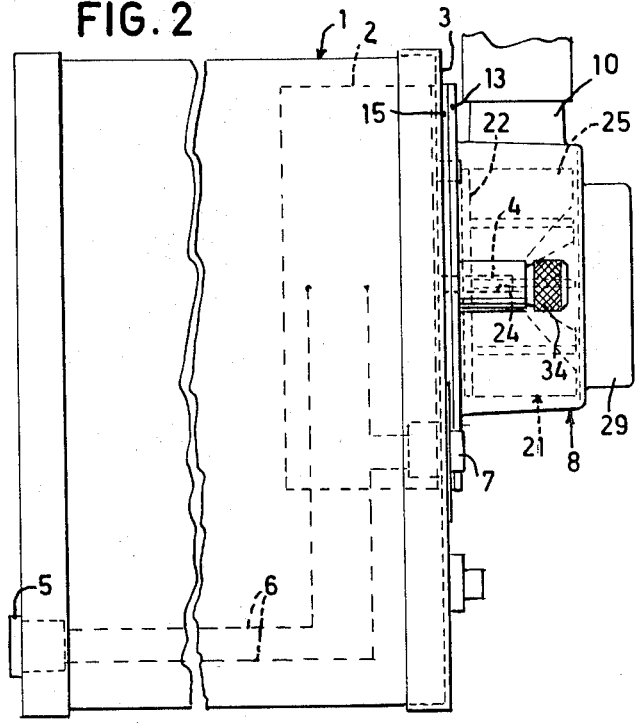
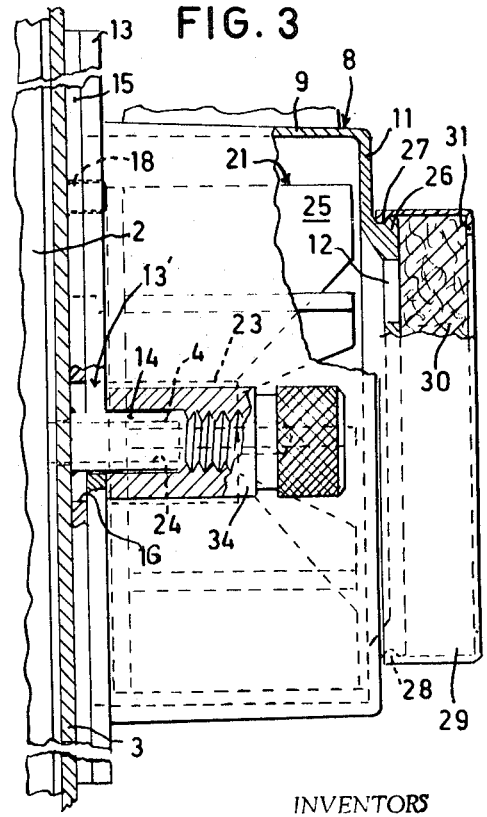
FIG. 1
FIG. 2
FIG. 3
INVENTORS
LEON ROBERT CAMETO
RALEIGH J. HARRIS
BY
*Boyken, Mohler, Foster & Schwab*
ATTORNEYS

3,606,589
BLOWER STRUCTURE FOR RESPIRATORY AIR
Leon Robert Cameto and Raleigh Joseph Harris, Oakland, Calif., assignors to Mist O₂ Gen Equipment Co., Oakland, Calif.
Filed July 16, 1970, Ser. No. 55,337
Int. Cl. F04b $17/00$; F04d $29/00$
U.S. Cl. 417—360
4 Claims

ABSTRACT OF THE DISCLOSURE

Apparatus for circulating air for inhalation and for incorporating in said air, therapeutic aerosol, which apparatus includes a conduit having a motor-driven blower therein, through and past which blower the air for respiration by a patient is moved. Said blower and conduit are substantially isolated from the motor housing, but are carried thereby and are quickly removable from the motor and its housing for sterilization, and are quickly reattached.

SUMMARY

Heretofore blowers employed in the circulation of atmospheric room air having therapeutic aerosol incorporated therein from a nebulizer, have been enclosed in a canister or a housing enclosing the motor. The nebulizer, and the conduit connecting the blower with a mask, or open to discharge, have normally been outside the canister. This conduit, including an aspirator therein for drawing vapor from a nebulizer, have heretofore been removable from the canister for sterilization. However, the blower within the canister has either been inaccessible for sterilization or can be sterilized by equipment not readily available to most users of nebulizers and aerosol equipment.

The blower is normally of the centrifugal type, but in any event, it includes blades revolvable about an axis. The blades and interior of the blower housing are in forced, wiping contact with the room air. Consequently, the blades and interior of the housing, as well as the conduit and aspirator therein, and mask, when the latter is used, become contaminated with the impurities in air exhaled by a patient being treated. A subsequent patient may be infected unless the blower, as well as the conduit, aspirator and mask are sterilized after use.

One of the objects of the present invention is the provision of a blower wheel and blower housing that may be quickly removed from the canister that encloses the motor, together with the conduit and mask for sterilization.

Other objects and advantages will appear in the description and drawings.

DESCRIPTION OF DRAWINGS

FIG. 1 is an end view of the motor-enclosing canister showing the blower, conduit from the blower, aspirator, and parts connected with the conduit, such as a nebulizer.

FIG. 2 is a side-elevational view of the apparatus shown in FIG. 1 with certain parts, such as the aspirator, nebulizer and mask being omitted.

FIG. 3 is an enlarged, part elevational, part sectional view of the blower.

DETAILED DESCRIPTION

A housing or canister, generally designated 1, encloses an electric motor 2 (FIG. 2) which motor is secured stationary within the canister 1 adjacent to end wall 3 of the latter. The motor 2 in apparatus of this kind is normally approximately $\frac{1}{350}$ HP, and the canister is substantially closed, although wall 3 is formed with an aperture through which its driveshaft 4 rotatably extends (FIG. 3).

A conventional socket 5 (FIG. 2) may be provided in one wall of the canister for a conventional plug on an electric cord. Conductors 6 connect socket 5 with motor 2 and a switch 7. Switch 7 may be mounted on wall 3 for convenience. Other control means for the nebulizer may also be on wall 3.

The blower may be of the centrifugal type comprising a housing generally designated 8, having a cylindrical wall 9 formed with a generally tangentially-extending outlet 10 for air, and an end wall 11 centrally formed with a group of inlet openings 12, (FIGS. 1, 3).

A relatively wide annular flange 13, integral with the cylindrical wall 9, projects radially outwardly of the edge of wall 9 that is opposite to end wall 11.

Wall 3 of the canister 1 is provided with a pair of parallel, externally-threaded stud bolts 14 (FIGS. 1, 3) rigid therewith and projecting outwardly of said wall perpendicular thereto. Said bolts are equally spaced from shaft 4 at opposite sides of the latter and each is approximately centrally between the circular inner and outer edges of flange 13 (FIG. 1). Flange 13 is formed with a pair of keyhole openings 13' through which bolts 14 extend, as will later be explained more in detail.

A circular gasket 15 of a diameter equal to the outside diameter of flange 13 is formed with a pair of openings 16 for bolts 14 and is also formed with a central opening of approximately the diameter of shaft 4 for passing the latter therethrough. A relatively small opening 18 is formed in the marginal portion of gasket 15 for a projection 19 that is rigid with end wall 3, the purpose of which will later be explained. Said gasket 15 provides a seal between wall 3 and flange 13 when the blower housing is secured on the canister.

A blower wheel, generally designated 21, comprises a circular disc 22 formed with a central hub 23 projecting axially from one side of said disc. Hub 23 is formed with a central axially-extending recess 24 (FIG. 2). Said recess is closed at its outer end to form a stop for engaging the outer end of shaft 4 when the hub is pressed onto said shaft. The diameter of the recess 24 is such as to provide a press fit on shaft 4 sufficient to insure rotation of the blower wheel with said shaft, but permitting the wheel to be forceably pulled off the shaft. Said recess 24 may be ported to prevent trapping air therein upon positioning the wheel on the shaft.

An annular row of radially outwardly projecting blades 25 on wheel 21 are around and coaxial with hub 23 and with disc 22, and said blades are disposed in planes perpendicular to disc 22. Blades 25 are of corresponding shape, being respectively of progressively increasing width in a direction outwardly of hub 23 to a point approximately midway between hub 23 and the outer periphery of disc 22, although preferably slightly beyond such point, and the blades are each of uniform width from said point outwardly to the outer edges of the blades. Said outer edges extend normal to disc 22.

The inside diameter and width of blower housing 8 approximately corresponds to the maximum width of blades 25. Clearance is provided between the blades and the interior of the housing for free rotation of the blower wheel.

The central portion of wall 11 in which openings 12 are formed, projects slightly axially outwardly of the annular outer marginal portion of wall 11 (FIG. 3) providing a radially outwardly facing annular shoulder 26 formed with a radially outwardly opening recess 27 adapted to releasably receive the yieldable lip 28 of a cylinder 29. Cylinder 29 carries an air filter body 30 therein, said body extending over the group of openings 12 and is held by a radially inwardly projecting flange 31 when lip 28 is yieldably held in recess 27.

Keyhole openings or slots 13 are at diametrically opposite points around the flange, and spaced from outlet 10.

The smaller diameter ends of slots 13' are at the same sides of the larger diameter ends in a direction circumferentially of the flange. Said slots are positioned for passing bolts 14 therethrough, the smaller diameter ends of said slots being slightly larger than the diameter of each bolt.

An elongated, tubular nut 34 of an outside diameter slightly smaller than the larger diameter end of each slot 33, and of a larger diameter than the smaller diameter end of each slot, is adapted to threadedly engage the threads on the outer end portion of each bolt 14. The outer end of each nut 34 is closed and the outer end portion is exteriorly knurled for gripping by the fingers for loosening and for tightening the nuts.

In initially positioning the blower on the canister, the gasket 15 is first positioned on bolts 14 and shaft 4 will project through the central opening in the gasket 15, and the projection 19 will fit in and pass through opening 18.

This positions the gasket 15 with bolts 14 extending coaxially through openings 16, which openings are large enough to pass nuts 34.

The blower wheel is next installed, its hub being pressed onto shaft 4.

Housing 8 is then positioned on bolts 14 with projection 19 on end wall 3 projecting through opening 18 in said flange 13. The central opening in gasket 15 relatively closely passes shaft 4, but the larger diameter ends of the keyhole slots are sufficiently large to pass over nuts 34. Thus, projections 19 provide a quick positioning means for the gasket 15 and housing 8.

The housing 8 may then be given a fractional turn in one direction to seat the bolts 14 in the smaller diameter ends of the keyhole slots 13, after which the nuts 34 may be threaded onto the bolts 14 to tighten the housing against the gasket 15 and to support the housing rigid on the canister.

A flexible conduit 37 includes a fitting 38 on one end adapted to make a friction fit with a nipple 39 in outlet 10. This conduit extends to an aspirator 40 that, in turn, may be connected by a similar conduit to a conventional nose mask 41. The aspirator 40 is releasably connected in the usual way with a nebulizer 42 that may be actuated by a conventional connection 43 with the canister.

After the device is used, the nuts 34 may be loosened and the housing 8 may be quickly removed upon rotating the housing so the larger diameter ends of the keyhole slots are aligned with the nuts 34. The blower wheel and gasket 15 may then both be readily removed, without removing the nuts 34 since the openings in the gasket are slightly larger than the diameter of each nut 34.

The conduit 37 and aspirator may quickly be removed from the blower housing and nebulizer and the blower housing and wheel 21 may be quickly released from the canister and sterilized, and replaced.

It is also seen that the filter 30 may also be quickly replaced or sterilized. The gasket 15 is as quickly removable after removal of the blower housing and blower wheel, and it may be sterilized along with the housing and wheel. It is not necessary to remove the nuts 34 inasmuch as the openings in gasket 15 and the larger diameter ends of the keyhole slots will pass over the nuts when the nuts are loosened and the housing 8 is removed.

It should be noted that the side of housing 8 opposite to wall 11 is open, and the opening extends at 35 partly into the flange at 36 adjacent to outlet 10. Thus the walls defining the enclosure for the blower wheel includes the portion of gasket 15 extending to flange 3. When the blower housing is removed, the rear side of the housing is open, there being no crevices for contamination that could escape sterilization.

We claim:

1. In apparatus for circulating air in inhalation therapy that includes a canister enclosing an electric motor having a driveshaft and a wall on said canister having an aperture through which said shaft rotatably extends and projects outwardly therefrom to outside said canister:

(a) a centrifugal blower including a blower wheel outside said wall releasably secured on said shaft coaxial therewith, (b) a blower housing enclosing said blower wheel including a cylindrical wall coaxial with said wheel having one side open for receiving said wheel therethrough into said housing axially of said cylindrical wall, and a gasket between said cylindrical wall and said end wall having an opening through which said driveshaft closely but rotatably extends, (c) a side wall on said housing opposite to said open side of the latter having an inlet around the axis of said shaft for admission of air to said wheel and said cylindrical wall having an outlet whereby ambient air in the area outside said housing will be circulated through said housing upon actuation of said motor and rotation of said wheel, (d) securing means respectively on said wall of said canister and on said housing in releasable engagement for removably securing said housing and gasket on said wall of said housing in sealed relation to each other, whereby said air will be circulated through said housing in intimate contact with said gasket, blower wheel and the interior of said blower housing and whereby said gasket, wheel and blower housing may be removed from said shaft and canister for sterilization.

2. In apparatus as defined in claim 1:

(e) said securing means including a flange on said cylindrical wall of said housing projecting radially outwardly therefrom at the open side of said housing, and quick-release elements carried by said wall of said canister for clamping said flange and gasket to said last-mentioned wall.

3. In apparatus as defined in claim 2:

(f) positioning means respectively on said end wall and on said gasket and housing for positioning said gasket and housing relative to said elements for clamping engagement of said elements with said flange in predetermined fixed locations on said flange.

4. In apparatus as defined in claim 3:

(g) said flange being annular and formed with keyhole slots equally spaced from the axis of the cylindrical wall of said housing, each having a small diameter end and a large diameter end, said slots being in said predetermined fixed locations and said quick-release elements including bolts rigid on said wall of said canister projecting through said small diameter ends of said slots and nuts on said bolts extending over the marginal portions of the small diameter ends of said slots for clamping said flange and gasket against said wall of said cabinet when said nuts are tightened, the larger diameter ends of said slots being larger than said nuts for removal of said housing upon loosening said nuts and rotating said flange to axially register said larger diameter ends with said nuts, and openings in said gaskets for said bolts of sufficient diameter to receive said gasket upon removal of said blower wheel and housing and rotating said housing and flange to axially register said nuts with the axis of said larger diameter ends of said slots, whereby said housing is quickly removable and replaceable without removing said nuts.

References Cited

UNITED STATES PATENTS

| | | | |
|---|---|---|---|
| 1,941,527 | 1/1934 | Aske | 417—423 |
| 2,764,948 | 10/1956 | Jones | 417—360 |

ROBERT M. WALKER, Primary Examiner

U.S. Cl. X.R.

417—423; 415—201